United States Patent [19]

Malvassora

[11] Patent Number: 5,075,052
[45] Date of Patent: Dec. 24, 1991

[54] METHOD OF MANUFACTURING A MOTOR-VEHICLE STEERING WHEEL BY THE MOULDING OF PLASTICS MATERIAL SO THAT IT LOOKS LIKE A WOODEN STEERING WHEEL, AND A STEERING WHEEL PRODUCED BY THE METHOD

[75] Inventor: Giovanni Malvassora, Asti, Italy

[73] Assignee: Gallino Componenti Plastici S.p.A., Turin, Italy

[21] Appl. No.: 435,927

[22] Filed: Nov. 14, 1989

[30] Foreign Application Priority Data

Oct. 5, 1989 [IT] Italy ............................... 67854 A/89

[51] Int. Cl.$^5$ ............................................. B29C 67/00
[52] U.S. Cl. ..................................... 264/46.7; 249/55; 249/56; 249/114.1; 427/267; 427/270; 427/274; 427/280
[58] Field of Search ............... 427/267, 270, 274, 275, 427/280; 264/46.7, 77; 74/552, 558; 249/55, 56, 114.1

[56] References Cited

U.S. PATENT DOCUMENTS

| 1,548,528 | 8/1925 | Hiltz | 427/267 |
| 1,595,082 | 10/1926 | Gammeter | 74/552 X |
| 1,934,414 | 3/1931 | Fess | 427/280 X |
| 2,573,105 | 10/1951 | Lehman | 427/267 |
| 2,663,911 | 12/1953 | Waag et al. | 264/316 X |
| 3,363,956 | 9/1964 | Vingren et al. | 427/274 X |
| 4,419,908 | 12/1983 | Reikowski | 249/56 X |
| 4,640,150 | 2/1987 | Kobayashi et al. | 264/46.7 X |
| 4,919,388 | 4/1990 | Koike et al. | 249/114.1 X |

Primary Examiner—David A. Simmons
Assistant Examiner—J. Sells
Attorney, Agent, or Firm—Sughrue, Mion, Zinn, Macpeak & Seas

[57] ABSTRACT

A motor-vehicle steering wheel which is made of plastics material but looks like a wooden steering wheel is produced from a die having ribs such as to form in the moulded part indentations having a typical wood-grain pattern and arrangement. In the moulded part, the plastics material used for the moulding assumes a density of the same order of magnitude as that of a typical wooden steering wheel. A dark-colored ink is applied to the surface of the moulded part and penetrates the indentations to give them the wood-grain appearance, the ink subsequently being removed from the rest of the surface of the part and the part then undergoing a final varnishing step.

7 Claims, No Drawings

METHOD OF MANUFACTURING A MOTOR-VEHICLE STEERING WHEEL BY THE MOULDING OF PLASTICS MATERIAL SO THAT IT LOOKS LIKE A WOODEN STEERING WHEEL, AND A STEERING WHEEL PRODUCED BY THE METHOD

DESCRIPTION

The present invention relates to a method of manufacturing a motor-vehicle steering wheel by the moulding of plastics material so that it looks like a wooden steering wheel.

The use of wooden steering wheels is still widespread, particularly for sports cars or high-quality cars. Steering wheels of this type are also sometimes used in medium-quality cars, for example, because their users buy wooden steering wheels as spare parts and substitute them for the steering wheels with which their cars were originally provided.

In view of the fairly large demand, there is a problem resulting from the fact that steering wheels of this type are quite expensive.

In the past, it has been proposed to make plastics steering wheels which both look and feel to the user like wooden steering wheels.

A method for the production of a motor vehicle steering wheel which is made from plastics material but looks like a wooden steering wheel is described, for example, in French Patent No. FR-A-1 492 060, published on 18th Aug. 1967. According to the method described in this document, the steering wheel is produced by covering a moulded part of plastics material with a covering layer, also of plastics material, which is preformed according to the desired configuration and is inserted in the die before the part is moulded by the injection of thermoplastic resin.

The main disadvantage of this known method is that there is a risk of the steering wheel deteriorating after prolonged use, with detachment of the covering. Moreover, the steering wheel produced may look very much like a wooden steering wheel but it does not have other characteristics, such as, for example, the presence of a grain, which feel typical of wood to the user.

The object of the present invention is to overcome these disadvantages by means of a method which can be carried out quite simply and cheaply. According to the invention, this object is achieved by means of a method which is characterised by the following main characteristics:

a) the plastics material is moulded in a die whose surface has ribs shaped so as to produce in the moulded part indentations having a typical wood-grain pattern and arrangement;
b) the plastics material used for the moulding belongs to the family of rigid polyurethane foams and, in the moulded part, assumes a density of the same order of magnitude as that of a typical wooden steering wheel;
c) a dark-coloured ink is applied to the surface of the moulded part in the indentations and gives the latter the wood-grain appearance, the ink subsequently being removed from the rest of the surface of the part which then undergoes a final varnishing step.

By virtue of the above characteristics, the steering wheel produced looks and feels absolutely identical to a real wooden steering wheel, even after prolonged examination.

The invention will now be described in detail with reference to a typical embodiment which is given purely by way of non-limiting example.

The steering wheel usually has a metal frame including a hub, a rim and one or more spokes connecting the hub to the rim. The method described is used to give the wooden appearance solely to the rim of the steering wheel and in certain cases to parts of the spokes. For this purpose, the frame is inserted in a die into which the plastics material used for the moulding is injected. As already indicated, the surface of the die has a series of ribs and/or projections formed so as to produce indentations having a typical wood-grain pattern and arrangement in the moulded part.

If a steel die is used, the surface of the die may be formed by photoengraving or by manual engraving. In the case of nickel dies produced by electroforming, in the case of copper-beryllium dies produced by casting, or even in the case of dies made of silicon or epoxy resins, the ribs are produced by the provision of a suitable wooden pattern which is used - according to a conventional technique which is not described herein - as the starting point for making the die.

Before the plastics material is injected, the die is brought to the temperature necessary for the chemical reactions which take place during moulding to proceed correctly. This temperature is usually between 30° and 50° C.

Moreover, before the moulding is carried out, the surface of the die is treated with a release agent which enables the part to be removed from the die after moulding and prevents the risk of alteration of the indentations formed in the surface of the part.

The plastics material used for the moulding belongs to the family of rigid polyurethane foams and, in the moulded part, assumes an overall density of the same order of magnitude as that of a typical wooden steering wheel. Generally, this density may vary between 0.2 and 1.0 kg/dm$^3$ in dependence on the thickness of the part and the mechanical characteristics required, the surface layer being particularly compact with a density in the region of 1.0 kg/dm$^3$ whilst the inner layers assume an expanded structure characteristic of polyurethane foams. A density of 0.7 kg/dm$^3$ is similar to that of a low-density wood. This results in the steering wheel having a limited weight and, in particular, a low polar moment of inertia.

The colour of the polyurethane foam is adjusted in dependence on the basic shade required for the final varnishing.

Once the plastics material has been injected into the die, it is necessary to await the completion of the cross-linking (generally about 2-3 minutes), after which the part is removed from the die and a trimming step is carried out to remove the excess material including the sprue.

In order to make the surface of the part suitable for the subsequent varnishing, a degreasing operation is then carried out with solvent vapours. All traces of the release agent used in the moulding must be removed at this stage without altering the surface appearance of the part or causing the absorption of any solvent which would be detrimental to the subsequent steps.

Once the part has been degreased, the inking step is carried out and consists of the application, by means of a pad, of an ink, usually of a dark colour, whose function is to show up the indentations which are intended to resemble the wood grain. The colour of the ink is selected in dependence on the final result desired. The ink penetrates the indentations and stains them. The rest of the surface, however, is cleansed of ink by the application of a solvent, by means of a pad, to remove the excess ink outside the identations.

A final varnishing step can then be carried out and consists of the spraying on of a transparent polyurethane varnish. Preferably, a first layer of varnish is applied and then, after a period of approximately 30 minutes (which is not sufficient to dry the first layer but is equivalent to the 'flash' period), a second layer is applied. After the second layer has been applied, it is left for a period of 24 hours and the whole surface then undergoes fine-grade sanding and is subsequently cleansed with a blast of air. The sanding makes the surface smooth and receptive to the finishing layer. A relatively hard, abrasion-resistant varnish, for example, transparent acrylic varnish, is used for this finishing layer of varnish. After a period of about 1 hour, this is baked at a temperature of approximately 60° C. for a period of 1 hour.

As indicated above, the part thus produced (in particular, the rim of the steering wheel) looks absolutely identical to an equivalent wooden part and is also indistinguishable to the touch from a real wooden part even after careful examination.

Naturally, the principle of the invention remaining the same, the details of the means used in the method and the forms of embodiment of the method may be varied widely, without thereby departing from the scope of the present invention.

Moreover, the method according to the invention can also be used for producing decorative elements for the passenger compartment of a motor vehicle, such as mouldings, panels and the like. In any event, the use of the method described above in order to form parts of this type falls within the scope of the invention.

What is claimed is:

1. A method of manufacturing motor-vehicle steering wheels by the moulding of plastics material so that they look like as if they are made from wood, wherein it includes the following steps:
    a) a plastics material belonging to the family of rigid polyurethane foams is moulded in a die whose surface has ribs or projections shaped so as to produce in the moulded part indentations having a typical wood-grain pattern and arrangement, the plastics material assuming a density variable between 0.2 and 1.0 kg/dm$^3$;
    b) an ink is applied to the surface of the moulded part so as to penetrate the indentations and give the latter the wood-grain appearance, and
    c) the ink is subsequently removed from the rest of the surface of the part and the latter then undergoes a final varnishing step, further comprising providing a metal frame which comprises a hub, an annular core of a rim and at least one spoke which connects the core of the rim to the hub and arranging at least the core of the rim in the die so as to be covered by the plastics material upon completion of the moulding.

2. A method according to claim 1, wherein the inking step is carried out by means of a pad and the subsequent step of removing the ink outside the indentations is also carried out with a pad and solvent.

3. A method according to claim 1, wherein the final varnishing step comprises the spraying on of two layers of transparent polyurethane varnish with a pause of approximately 30 minutes between one layer and the next, and a finishing varnishing step carried out with a relatively hard, abrasion-resistant, transparent varnish.

4. A method according to claim 3, wherein before the finishing varnish step, there is a step in which the part is sanded completely with fine-grade sandpaper and then cleaned with a blast of air, the sanding step being carried out approximately 24 hours after the application of the second layer of transparent polyurethane varnish.

5. A method according to claim 4, wherein the part is left in air for a period of approximately 1 hour after the application of the finishing varnish, and is then baked at about 60° C. for a period of approximately 1 hour.

6. A method according to claim 1, wherein before inking, the surface of the part is degreased with solvent vapours.

7. A method according to claim 1, wherein before moulding, the die is heated to a temperature of approximately 30-50° C. and the surface of the die is treated with a release agent which enables the subsequent removal of the part from the die without the risk of alteration of the appearance of the indentations.

* * * * *